B. AND S. H. LEE.
TEMPORARY OR PERMANENT SUPPORT FOR VEHICLE SOLID BAND TIRES.
APPLICATION FILED JAN. 31, 1918.
1,385,920.
Patented July 26, 1921.
3 SHEETS—SHEET 1.
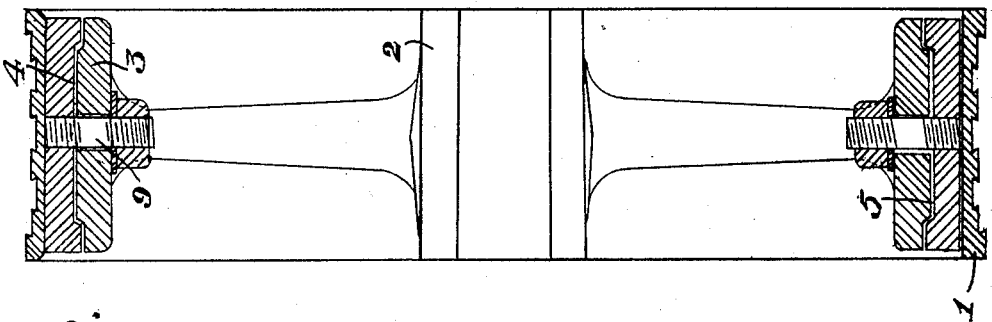
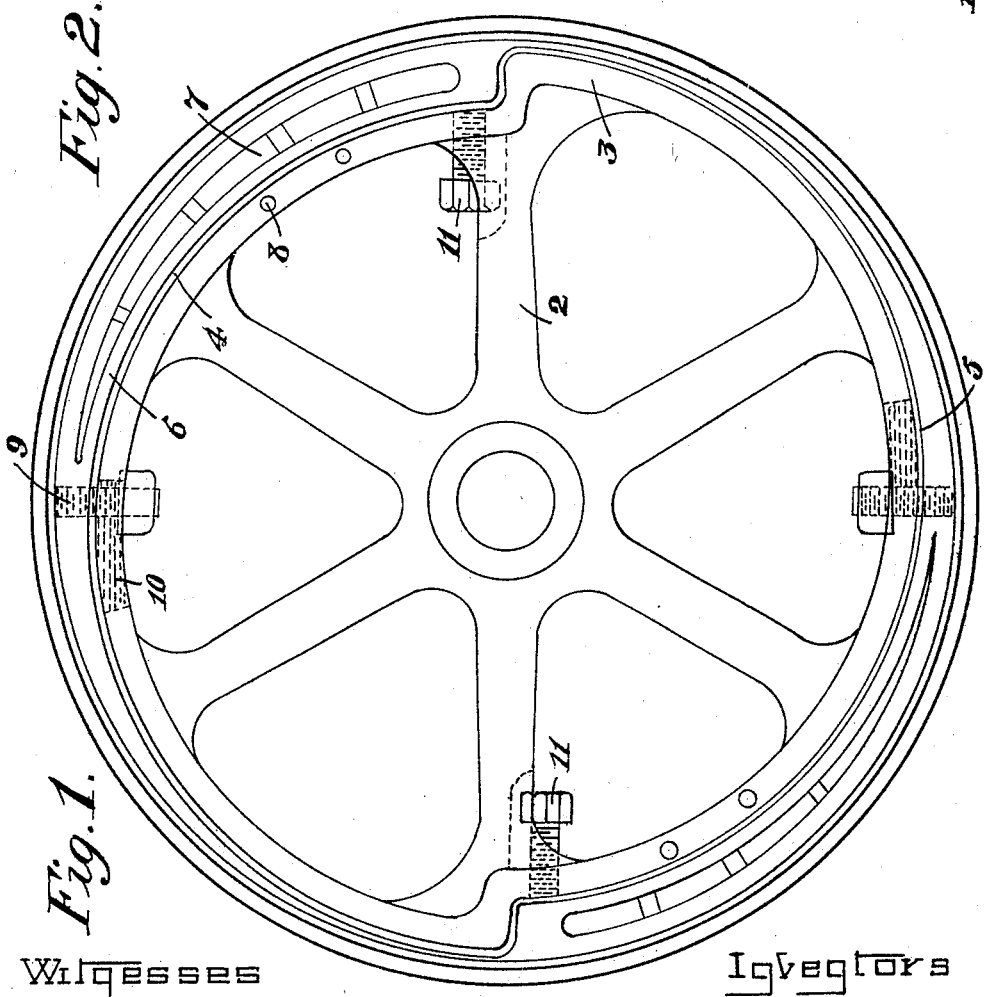

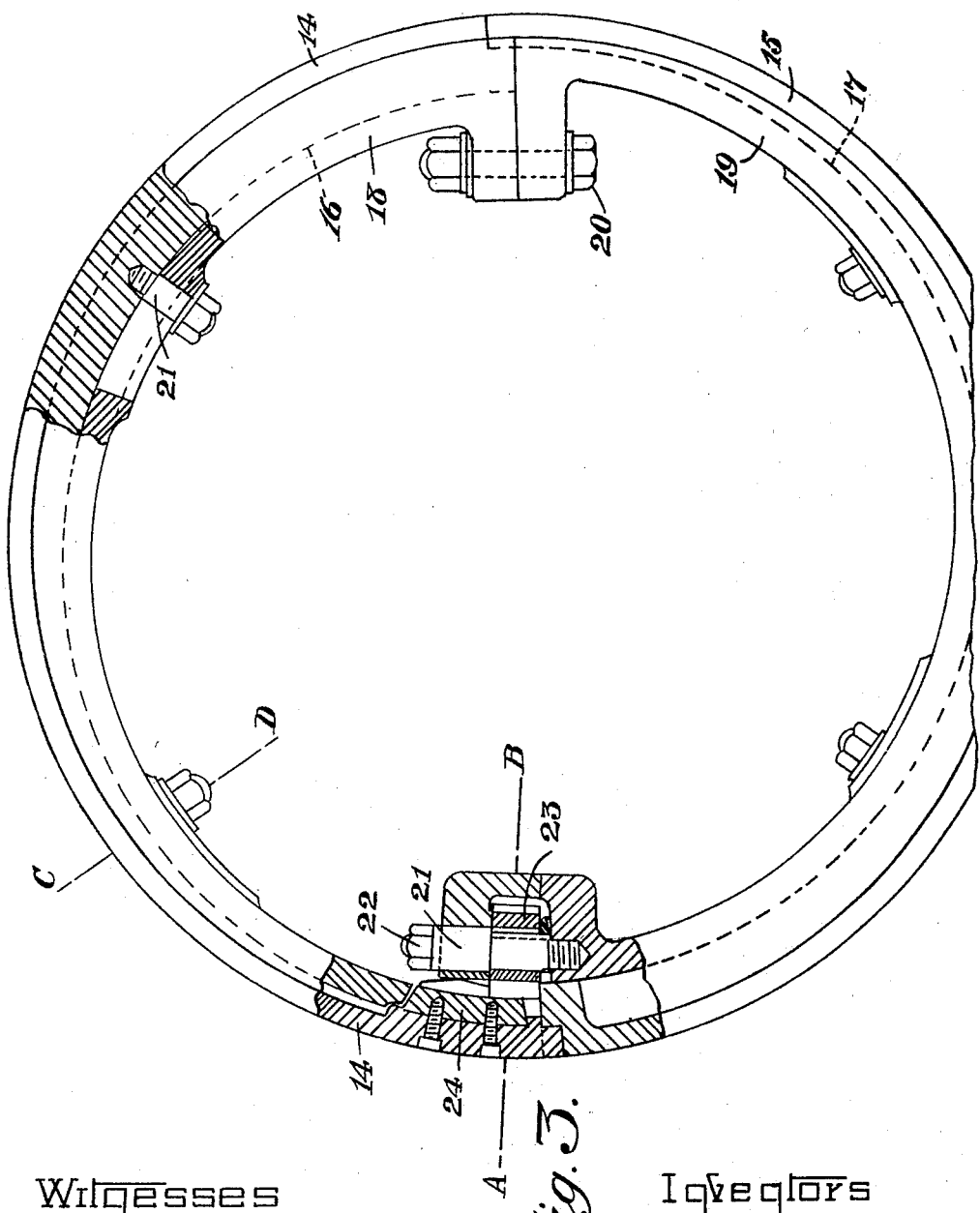

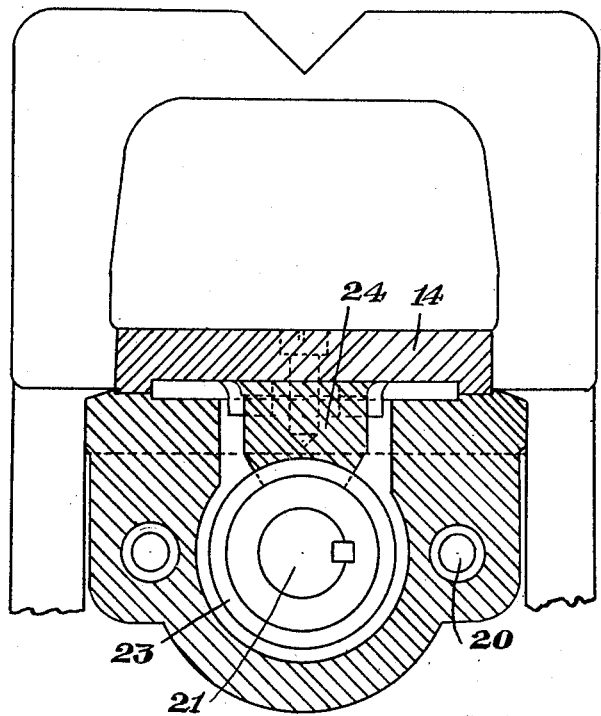
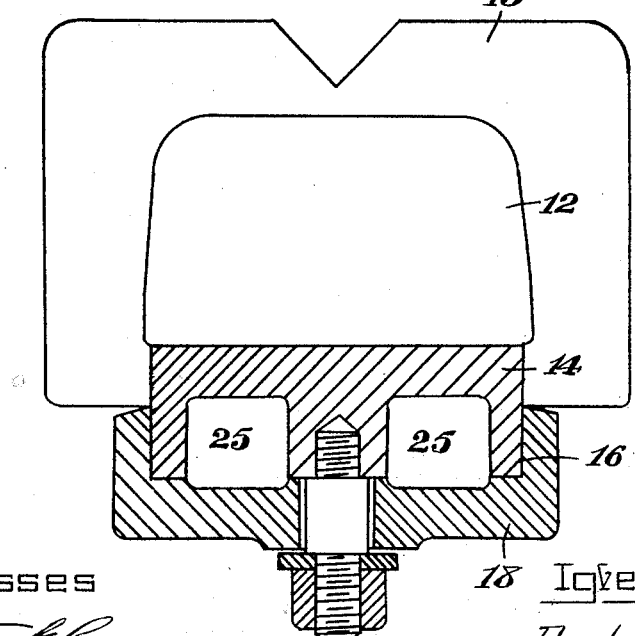

UNITED STATES PATENT OFFICE.

BENJAMIN LEE AND SAM HARRY LEE, OF SANKEY, ENGLAND.

TEMPORARY OR PERMANENT SUPPORT FOR VEHICLE SOLID BAND-TIRES.

1,385,920.  Specification of Letters Patent.  Patented July 26, 1921.

Application filed January 31, 1918. Serial No. 214,713.

*To all whom it may concern:*

Be it known that we, BENJAMIN LEE and SAM HARRY LEE, subjects of the King of Great Britain, residing at Sankey, in the county of Lancaster and Kingdom of England, have invented certain new and useful Improvements in and Relating to Temporary or Permanent Supports for Vehicle Solid Band-Tires, of which the following is a specification.

The present invention relates to an improved device or arrangement capable in one adaptation as a temporary support for solid band tires for vehicles in the process of manufacture and in another adaptation as a vehicle wheel to hold a finished solid band tire.

In the making of a solid band tire, it is usual to build unvulcanized rubber on a rim, and then to subject this to hydraulic pressure under suitable temperature with a view to vulcanizing the rubber. Such a metal annulus with its rubber tread is then slipped, usually by hydraulic pressure, on to the felly of the wheel of the vehicle destined to carry it.

Now difficulties have hitherto been present in the clamping of the wheel annulus adapted to carry the rubber tread during the vulcanizing period. If the rim or annulus was not an accurate fit on the core ring, then it was necessary to insert packing, and under a high hydraulic pressure this packing often shifted and caused the buckling of the rim. In replacing rims which have received a new tread upon wheels, there has also been found to be the disadvantage that the rim has expanded and permanent packing has to be inserted on the inner surface of the rim, so that it is once again a close fit on the felly of the wheel.

Now according to the present invention, an expandible core ring is provided adapted to engage internally the rim, or annulus carrying the rubber treads, which expandible ring is formed of a substantially circular member. This member consists of two integral parts, each part being semi-circular, but offset relatively to the other part; that is to say that the circular parts may be of similar radius but with different centers.

Between this member and the internal surface of the rim are placed two or more pieces tapering circularly. These pieces, where for instance two are used, will have their broadest section obviously arranged at the offset point of the two parts of the above mentioned member, and, if desired may have a short lip projecting under the end portion of the other part of the said member.

The present invention is more particularly described with reference to the accompanying drawings, in which:—

Figure 1 shows the application of the invention in one form of vehicle, while

Fig. 2 is a corresponding cross-section view thereof,

Fig. 3 shows the application of the invention in a modified form of a temporary support for molding tires upon a rim.

Fig. 4 shows a cross-section on the line A, B, of Fig. 3.

Fig. 5 is a cross-section on the line C, D, of Fig. 3.

The circular rim 1 may be of any usual standard form to receive the solid band tire or the like. For the purpose of fitting this rim 1 on the wheel 2, the fixed rim 3 of the wheel is formed with a pair of outer eccentric surfaces 4, 5, adapted to engage with corresponding surfaces on the inner side of a wedge ring 6.

This wedge ring 6 may be displaced relatively to the fixed rim of the wheel 2 by the engagement of a suitable tool with slots 7 therein, or the wheel 2 could be turned relatively to the wedge wheel 6 by the engagement of a tool with perforations 8 therein.

The wedge ring 6 carries bolts 9, which pass through slots 10 in the fixed rim 3 and so form means to guide the wedge ring on the said fixed rim.

The fixed rim 3 may be provided with a pair of set screws 11, adapted to engage the surface of the wedge ring 6 so that the fixed rim and the wedge ring can be locked in any desired relative position of adjustment.

Fig. 3 illustrates a modified form of the invention as applied to a rim during the manufacture of a tire thereon. The rim with the tire 12 thereon is pressed within the mold 13, adapted to be subjected to hydraulic pressure. This would cause possibly the internal buckling of the rim, to prevent which an expandible member consisting of two parts 14, 15, is provided.

These parts 14, 15 are circular on their outside edge, but have eccentric inner edges 16, 17 adapted to coöperate with corresponding surfaces on a thrust member or ring formed of two halves 18, 19, bolted together by means of bolts 20, and guided on the wedge ring or parts 14, 15 by means of bolts 21 in a similar manner to the guide of the fixed rim 3 upon the wedge ring 6 as described with reference to Figs. 1, 2.

The displacement of the wedge ring formed of parts 14, 15 relatively to the thrust member or ring formed of parts 18, 19, is obtained by the rotation of a bolt 21 having a hexagon head 22, and which has keyed thereon a worm wheel 23 engaging with a rack 24, bolted to the part 14 of the wedge ring. Consequently by turning the bolt head 22, by means of a spanner or the like, a reactionary thrust is obtained between the worm wheel 23, and the worm 24, and as the worm wheel 23, is on the movable part 19, while the worm 24, is on the fixed part 14, relative rotation is produced between these parts about the center of the wheel so that the part 14 will be expanded owing to the eccentric surfaces 16, sliding over one another.

The wedge ring 14, 15 and the thrust ring 18, 19 may be lightened by the cut-out of the parts such as 25.

It is obvious, of course, that instead of having a wedge ring and coöperating thrust member, two eccentric surfaces 4, 5 or any number of off-set eccentric surfaces can be provided.

We declare that what we claim is:—

A tire support comprising a rim having a circular internal periphery, a rotatable one-piece member within said rim having a circular outer surface capable of expansion, internal partially circular surfaces integral with said member and staggered eccentrically to the center of rotation of the member, a separate abutment ring having external complementary surfaces thereon, circularly disposed, and coöperating means between said rim and said rotatable member to positively displace said member relatively to said rim to cause expansion of the said rotatable member into engagement with said rim.

In witness whereof we have hereunto signed our names this fifth day of November 1917, in the presence of two subscribing witnesses.

BENJAMIN LEE.
SAM HARRY LEE.

Witnesses:
J. VICTOR ARMSTRONG,
J. McLACHLAN.